US005333941A

United States Patent [19]
Hart et al.

[11] Patent Number: 5,333,941
[45] Date of Patent: Aug. 2, 1994

[54] HIGH PRESSURE VALVE FOR RAILWAY CAR BRAKE CONTROL VALVE DEVICE

[75] Inventors: James E. Hart, Trafford; John B. Carroll, Irwin, both of Pa.

[73] Assignee: Westinghouse Air Brake Company, Wilmerding, Pa.

[21] Appl. No.: 976,823

[22] Filed: Nov. 16, 1992

[51] Int. Cl.$^5$ .................. B60T 15/02

[52] U.S. Cl. .................. 303/40; 303/41

[58] Field of Search .................. 303/28, 35-37, 303/40, 41

[56] References Cited

U.S. PATENT DOCUMENTS 2,034,288 3/1936 Farmer .................. 303/35

5,071,198 12/1991 Troiani .................. 303/41

*Primary Examiner*—Robert J. Oberleitner

*Assistant Examiner*—Lee W. Young

*Attorney, Agent, or Firm*—Gary J. Falce

[57] ABSTRACT

A spool type valve arrangement in which a booster spring is employed to overcome static friction of the spool valve O-rings and thereby assure prompt actuation of the spool valve member. The arrangement is such that the booster spring is only active through a limited distance of travel from release position toward application position, this limited distance of spool valve travel being selected so as to occur prior to any transition of the port connections controlled by the spool valve. In this manner, the spool valve return spring force need not be increased in order to reset the spool valve sufficiently to reestablish the original spool valve port connections.

17 Claims, 3 Drawing Sheets

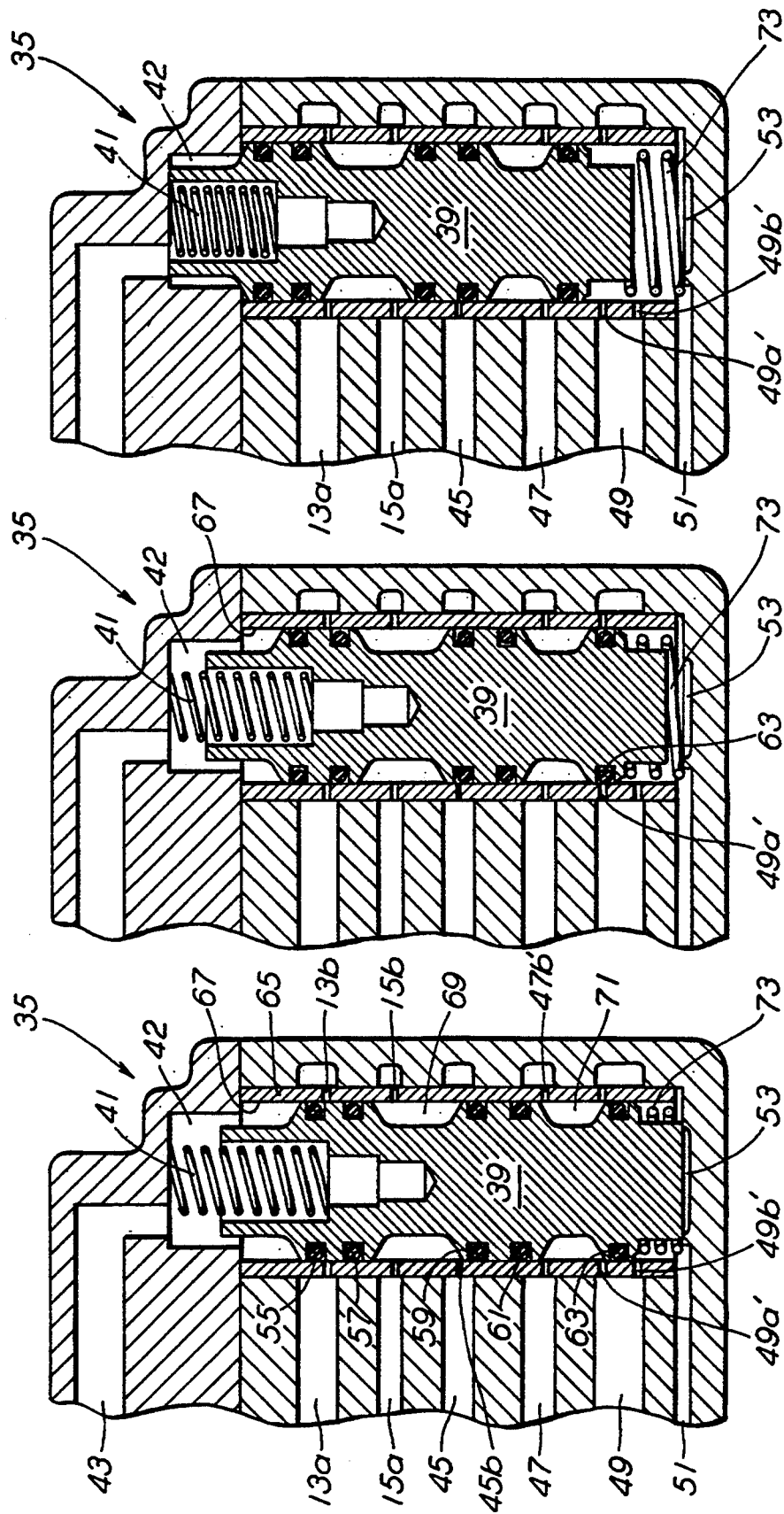

HIGH PRESSURE VALVE FOR RAILWAY CAR BRAKE CONTROL VALVE DEVICE

BACKGROUND OF THE INVENTION

The present invention relates to spool valve devices, such as employed in pneumatic control valves for railway freight cars and particularly to the high pressure spool valve whose main function is to connect emergency reservoir air to the car brake cylinders during an emergency brake application and thereby provide a higher emergency brake pressure than the maximum attainable service brake pressure.

While it is generally accepted that spool type valves are desirable from the standpoint that a substantially leak free operation can be economically achieved over a long service life, it is also recognized that the pressure seals that make the foregoing possible may also introduce a friction component that causes resistance to spool valve actuation. In the industry standard, ABD/W type freight brake control valves, and in newer ABDX valves, the high pressure spool valve device is designed to provide, in addition to the main function of providing high pressure during emergency, the function of trapping service brake pressure on the inshot valve piston during emergency to assure the same inshot brake pressure when making an emergency on top of a service application as when making a straightaway emergency; and the quick action chamber blowdown function to delay recharging the train brake pipe pressure following an emergency brake application for a period of time sufficient to assure a complete halt of the train and thereby prevent premature release of the emergency brake application.

In combining these several functions in a single spool valve, numerous O-ring seals are provided on the spool to prevent cross leakage between the several spool valve grooves via which the appropriate pressure connections are made. Consequently, the high pressure spool valve device may be subject to somewhat high breakout resistance to valve actuation, from both its release and emergency application positions, due to the relatively high breakaway friction between these O-ring seals and the spool bushing with which the O-rings are sealingly engaged.

For example, the high pressure spool valve is pressure actuated from its normal release position to an application position in response to an emergency brake application to provide the above-mentioned functions; and in its application position is actuated by a return spring to reset the valve to its normal release position. It will be appreciated that prior to such actuation to either application or release position, the spool valve sits in a static condition in which O-ring friction and thus frictional resistance to valve actuation is maximum. Accordingly, the return spring must be relatively strong to overcome this static friction and assure reset of the spool valve from application to release position. The force exerted by this relatively strong return spring in release position, however, counteracts the pressure actuating force during an emergency to such extent that emergency actuation of the high pressure spool valve under very low pressure conditions can be impeded.

SUMMARY OF THE INVENTION

The object of the present invention is to utilize a limited travel, booster spring to overcome O-ring static, breakout friction from release position. This assists spool valve actuation to emergency position without impeding the effect of the opposing spool valve return spring when the spool valve must be subsequently reset.

In carrying out the foregoing objective, there is provided spool valve means for a railway car brake control valve device comprising a spool member subject on opposite sides thereof to fluid under pressure and having at least one seal ring surrounding the periphery thereof, a bushing in which the spool member is reciprocally disposed for axial movement between a release position and an emergency application position, the bushing including at least two axially spaced ports connected to each other by the spool member in one of the release and application positions and disconnected from each other by the spool member in the other of the release and application positions to thereby provide a certain brake control function, a first spring acting on the spool member in the direction of release position, and a second spring acting on the spool member in the direction of application position only through a limited distance of travel of the spool member from release position toward application position prior to the changeover between the connected and disconnected conditions of the two ports.

BRIEF DESCRIPTION OF THE DRAWINGS

This and other objects and advantages of the present invention will become apparent from the following more detailed explanation of the invention when taken in conjunction with the accompanying drawings in which:

FIG. 2 is a fragmentary sectional assembly view showing the high pressure valve device of FIG. 1 with the spool member in its release position and modified by the provision of a helical booster spring shown in a state of compression;

FIG. 3 is a fragmentary sectional assembly view showing the high pressure spool valve of the present invention in its application position in which it is disengaged from the booster spring;

FIG. 4 is a fragmentary sectional assembly view showing the high pressure spool valve of the present invention in an intermediate position in which the booster spring is expanded to its free height just prior to disengagement from the spool member;

DESCRIPTION AND OPERATION

Figure 1:
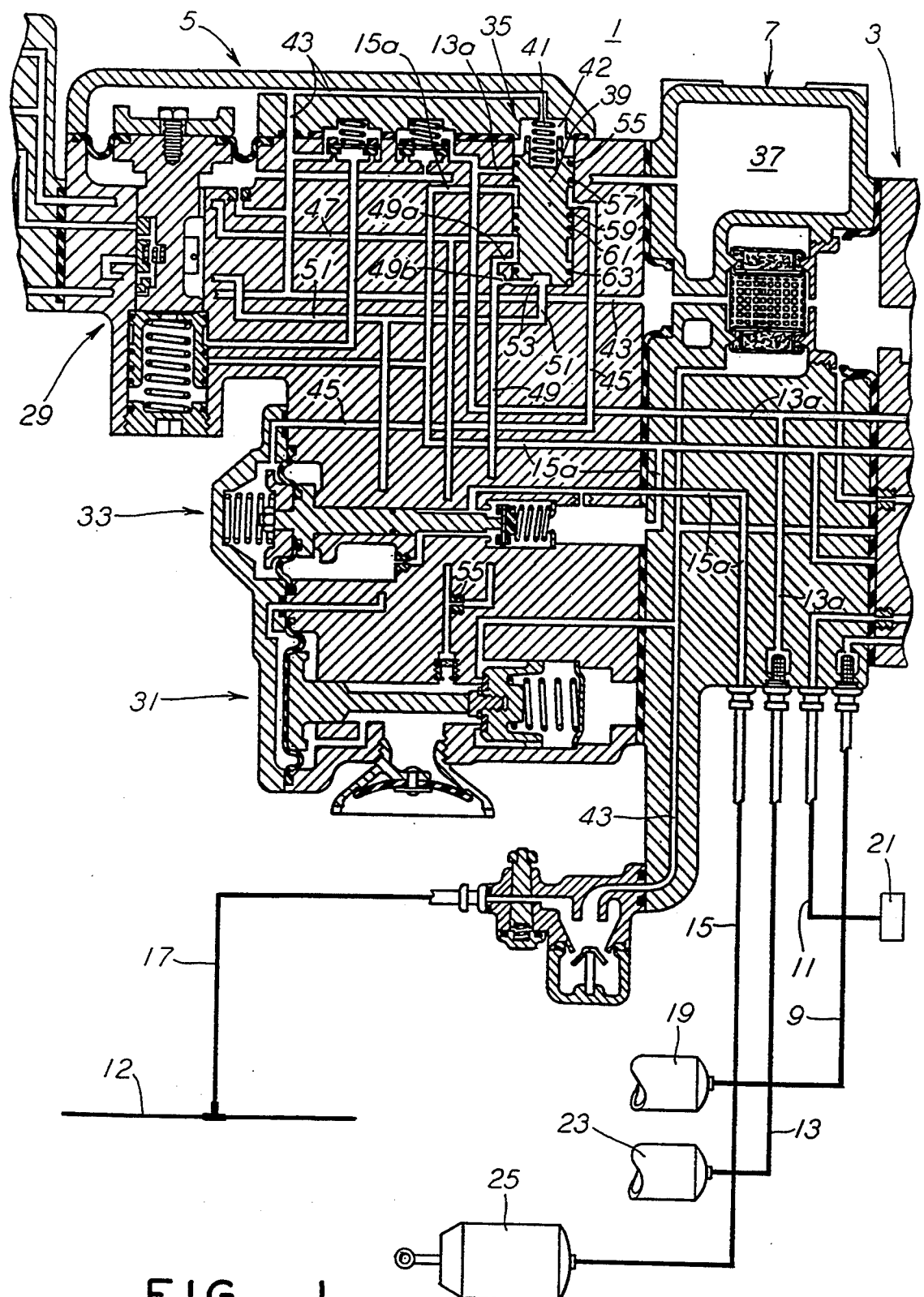
FIG. 1 is a diagrammatic view of a freight brake control valve device known in the prior art showing a high pressure valve device with which the present invention is concerned.

Referring now to FIG. 1, there is shown a standard, well-known ABDW type freight brake control valve 1 having a service portion 3 (only partially shown), an emergency portion 5, and a pipe bracket 7 to which the service and emergency portions are bolted. Connected to pipe bracket 7 via pipes 9, 11, 13, 15 and 17 are an auxiliary reservoir 19, an exhaust retainer valve 21, an emergency reservoir 23, a brake cylinder 25, and the car brake pipe 27, respectively.

Emergency portion 5 includes an emergency valve 29, a vent valve 31, an inshot valve 33, and a high pressure valve 35. These valves are all shown in the position they assume in response to charging of brake pipe 27, such charging also effecting charging of the auxiliary reservoir 19, emergency reservoir 23 and a quick action chamber 37 formed in pipe bracket 7 to the running pressure carried in the brake pipe.

At high pressure valve 35, a spool valve member 39 is urged by a return spring 41 toward a release position, as shown. Also, brake pipe pressure is connected via a passage 43 to a chamber 42 on the upper side of spool valve 39 to reinforce return spring 41. In this release position, spool member 39 blanks a passage 13a leading from emergency reservoir 23 and pipe 13; connects a passage 15a leading from brake cylinder 25 and pipe 15 to a passage 45 leading to the inshot valve control chamber; and connects a passage 47 leading from emergency valve 29 to a vent passage 49 via a first flow path 49a. Another passage 51 leading from emergency valve 29 is connected to a chamber 53 on the underside of spool valve 39 and thence to vent passage 49 via a second, restricted flow path 49b. In order to prevent cross leakage between interrupted ones of these passages, a total of five O-rings 55, 57, 59 61 and 63 are installed on the periphery of spool valve 39 to provide a pressure seal with the body in which spool member 39 operates. In actual practice this body is a bushing 65, as shown in FIGS. 2-4, but omitted in the diagrammatic view of FIG. 1 for clarity.

Referring to FIGS. 2-4, spool valve member 39 is operatively disposed in a bore 67 of bushing 65 and includes in addition to the plurality of spaced, annular O-ring seals 55-63, a first annular groove 69 between O-rings 57, 59 and another annular groove 71 between O-rings 61, 63. Passages 13a, 15a, 45, 47 and 49 are each connected to bore 67 by a series of radial connecting ports 13b, 15b, 45b, 47b and 49a', 49b' in bushing 65, respectively, connecting ports 49a', 49b' corresponding to the aforementioned first and second flow paths 49a, 49b of FIG. 1.

During service brake applications, the reduction of brake pipe pressure is reflected at chamber 42 of high pressure valve 35 as well as at emergency valve 29. Due to the well-known breathing of quick action chamber pressure, however, the brake pipe pressure reduction is counterbalanced at emergency valve 29 to accordingly stabilize emergency valve 29 in its shown release position. Passage 51 leading to chamber 53 of high pressure valve 35 is cut off from quick action chamber pressure in release position of emergency valve 29 to prevent actuation of the high pressure spool member 39.

When an emergency brake application is made, brake pipe pressure is reduced at a faster rate than when a service application is made so that the breathing of quick action chamber pressure is unable to counteract the emergency reduction of brake pipe pressure. Thus, a pressure differential is developed across emergency valve 29, which is accordingly actuated to emergency position. As is well-known, in emergency position, quick action chamber pressure is connected to passage 51 leading to the vent valve control chamber (FIG. 1) and to chamber 53 under the high pressure spool valve member 39. The connection of quick action chamber pressure to vent passage 49 via radial connecting ports 49a' comprising the restricted flow path 49b at high pressure valve 35 causes this pressure to buildup in passage 51. Consequently, vent valve 31 is actuated to obtain a very rapid exhaust of brake pipe pressure to propagate the emergency application- This eliminates the downward brake pipe pressure loading in chamber 42 above the high pressure spool valve member 39. At the same time, pressure in passage 51 builds up in chamber 53 sufficiently to overcome the resistance of the O-rings on spool valve 39 and return spring 41 to cause spool valve 39 to be shifted upwardly to its application position. It is desirable to have this actuation of the high pressure spool valve 35 occur at the lowest possible pressure.

At various positions of spool valve 39 between release and application positions, the aforementioned spool valve porting transitions are made.

In application position, spool valve member 39 connects emergency reservoir pressure in passage 13a to passage 15a leading to brake cylinder 25 via inshot valve 33, where it is combined with auxiliary reservoir pressure provided by the service valve (not shown) in service portion 3 to provide the high brake cylinder pressure desired in an emergency application; blanks passage 45 to trap any auxiliary reservoir pressure existing in the inshot valve control chamber from a previous service brake application to assure the same inshot pressure during an emergency on top of a service application as is obtained when making a straightaway emergency; isolates passage 47 from vent passage 49 to terminate breathing of quick action chamber pressure; and connects quick action chamber pressure in passage 51 and chamber 53 under spool valve 39 to vent passage 49 via radial ports 49a' and 49b' comprising parallel flow paths 49a and 49b, to initiate the blowdown of quick action chamber pressure via a blowdown choke 55 (FIG. 1) that restricts the exhaust of vent valve control pressure and thereby delays closure of the vent valve 31 for approximately 60 sec. Until this delay period expires, the vent valve remains open, preventing brake pipe 27 from being recharged to release the brakes.

It is important to note that following the blowdown of quick action chamber pressure from chamber 53 under spool valve 39, the force of return spring 41 causes spool valve 39 to be reset to its original release position. This is intended to occur prior to brake pipe pressure being supplied to chamber 42 above spool valve 39 during brake release and recharge. For this reason, return spring 41 must be sufficiently strong to overcome the relatively high O-ring friction resisting movement of spool valve 39. It will now be appreciated that in making return spring 41 sufficiently strong to assure reset of spool valve 39 from its application position to its release position, however, this relatively high spring force counteracts movement of spool valve member 39 in the opposite direction, i.e., from release position to application position.

In accordance with one embodiment of the present invention, a helical coil type booster spring 73 is provided, as shown in FIGS. 2-4, to assure prompt actuation of spool valve member 39 in response to an emergency brake application, particularly where the static friction of the spool valve O-rings is high. Such high static friction, when combined with the force of return spring 41, can result in higher than desirable resistance to actuation of spool valve member 39. Booster spring 73 is compressed in release position by the force of brake pipe pressure acting downward on the spool. Booster spring 73 bears against the underside of spool valve member 39 only through a limited distance of travel of the spool valve member. In order to accommodate this booster spring 73, the outside diameter of the present standard high pressure spool valve member 39 is reduced in the area between O-ring 63 and the bottom end of the spool member 39. The free height of booster spring 73 is such as to exert an upward force on spool member 39 through a limited distance of travel to supplement the force of quick action chamber pressure in chamber 53 acting on the underside of spool member 39, in order to overcome the aforementioned resistance to actuation of the spool member during an emergency application, due to the force exerted by return spring 41 and the static friction of the spool valve O-rings, thereby obtaining fast, positive breakout response of the high pressure valve 35. As shown in FIG. 2, spool member 39 is maintained in release position by the combined forces of brake pipe pressure in chamber 42 and return spring 41 following charging of brake control valve 1. In this release position, booster spring 73 is in a compressed state, the amount of compression from the spring free height being relatively small, so that the booster spring is thus only active for a relatively short distance of movement of spool valve 39 from its compressed release position toward its uncompressed application position. The maximum force exerted on spool valve 39 by booster spring 73 is greater than the opposing force exerted by return spring 41 until booster spring 73 is nearly fully expanded.

As previously explained, when an emergency brake application is made, quick action chamber pressure is connected by emergency valve 29 to chamber 53 under the high pressure spool valve 39, while concurrently the brake pipe pressure in chamber 42 above spool valve 39 is exhausted. With the reduction of brake pipe pressure in chamber 42, return spring 41 alone is not sufficiently strong to maintain spool valve 39 in its release position. Consequently, initial movement of spool valve 39 occurs under the combined forces of booster spring 73 and the pressure in chamber 53 through a limited distance of spool valve travel, until booster spring 73 expands to its full or free height. It will be appreciated that no port transitions occur during this limited travel of spool valve member 39 and booster spring 73 is thus only effective to help overcome static breakout friction of the spool valve O-rings that otherwise might tend to retard initial actuation of spool valve 39.

The position of spool valve 39 at the free height of booster spring 73 is shown in FIG. 4, where O-ring 63 has not yet crossed over bushing port 49a', such transition being the initial control function provided by spool valve member 39 incident to an emergency brake application. The upward distance spool valve 39 moves from release position to this initial transition position is 0.105-0.135 inches, which corresponds to the maximum deflection of booster spring 73 from its compressed state in release position to its free height. In this position of spool valve 39, it will be noted that still further upward movement of spool valve 39 must occur to effect the other port transitions provided by the high pressure valve 35, the important point being that the force of booster spring 73 acts on spool valve member 39 only prior to the initial port transition taking place during movement of the spool valve from release to application position and is absent thereafter. Except for the limited action of booster spring 73, the high pressure valve of the present invention operates in the same manner as the present standard high pressure valve and accordingly makes the same port connections in the same sequence without changing the location of the spool valve O-rings and/or the respective connecting ports in bushing 65.

As shown in FIG. 3, the port connections provided by spool valve 39 in emergency application position are established, as previously explained, and following the timed blowdown of quick action chamber pressure in chamber 53 acting on the underside of spool valve 39, return spring 41 becomes effective to force spool valve 39 in a downward direction toward release position. Since spool valve 39 does not re-establish engagement with booster spring 73 until it moves just beyond its initial transition position, all of the original port connections will be re-established without any influence whatsoever from booster spring 73. In this regard, the force of return spring 41 does not need to be increased in view of the additional counteracting force of booster spring 73, since the booster spring is, in effect, inactive until all of the port transitions have occurred. In thus re-establishing the original port connections, brake pipe pressure is assured of being connected to chamber 42 above spool valve member 39 when the emergency brake application is released to thereby provide a downward acting pressure differential across spool valve member 39. This downward acting pressure differential, combined with the force of return spring 41 drives spool valve member 39 to full release position against the opposing force of booster spring 73, which is compressed from its free height to provide a supplemental actuating force on spool valve member 39 preparatory to a subsequent emergency brake application. The energy stored by spring 73 in its compressed state for providing the aforementioned supplemental actuating force on spool valve member 39 is thus provided by the brake pipe pressure acting on spool valve member 39 following movement of the spool valve to its intermediate position by return spring 41.

Figure 5:
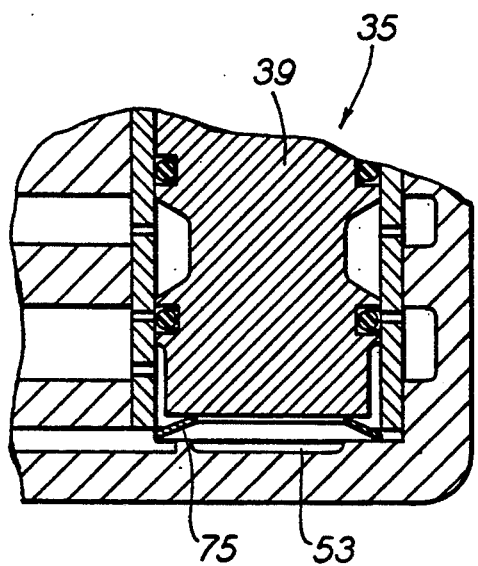
FIG. 5 is a fregmentary sectional assembly view showing an alternate embodiment of the invention in which the booster spring is in the form of a disc spring, such as a Belleville type spring.

Referring now to FIG. 5, there is shown an alternate embodiment of the invention in which a disc type booster spring 75, such as a commonly known Belleville type spring, is employed. This spring 75 is disposed in the chamber 53 formed in spool bore 67 so as to act between the bottom of the spool bore and the underside of the spool valve member 35.

Figure 6:
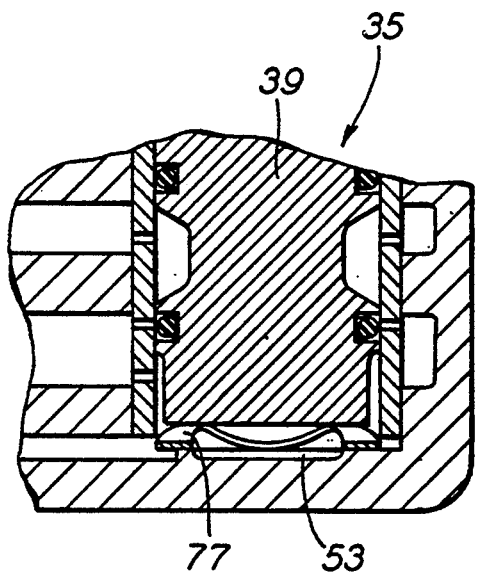
FIG. 6 is a fragmentary sectional assembly view showing another embodiment of the invention in which the booster spring is in the form of a wave spring.

Another embodiment of the invention is shown in FIG. 6, in which the booster spring is a wave type spring 77. This spring 77 is also disposed in chamber 53 between the bottom of spool bore 67 and spool valve member 35.

Similar to the helical booster spring 73 arrangement, these alternate type springs 75 and 77 are held in a state of compression in the normal release position corresponding to the position shown in FIG. 2. A force is thus exerted on spool valve member 35 sufficient to overcome the static friction of the spool valve O-ring seals and thereby assure fast and positive actuation of spool valve member 39 in support of quick action chamber pressure being supplied to chamber 53 when an emergency brake application is called for. These springs 75 and 77 expand to their free height condition just prior to reaching the intermediate position shown in FIGS. 5 and 6, in which the initial transition of spool valve porting occurs.

Unlike the arrangement of helical booster spring 73, however, the assembly of these springs 75 and 77 requires no modification of the spool valve member 39 or the body housing the spool member.

In accordance with the foregoing, it will now be appreciated that booster springs 73, 75 and 77 provide a positive auxiliary force that acts on spool valve member 39 of the high pressure valve 35 to assure prompt, reliable valve actuation, even after such long periods of inactivity and/or excessive O-ring friction as tends to retard or even prevent valve actuation, in response to an emergency brake application without, in any way whatsoever, affecting the functional requirements of the high pressure valve.

We claim:

1. Spool valve means for a railway car brake control valve device comprising:
   (a) spool member having its opposite ends subject to fluid under pressure and having at least one annular elastomeric pressure seal surrounding the periphery thereof;
   (b) a bore in which said spool member is reciprocally disposed for axial movement in opposite directions between a release position and an application position;
   (c) at least two axially spaced ports opening into said bore and connected to each other by said spool member in said release position;
   (d) said spool member in a position intermediate said release and application positions locating said elastomeric seal between said spaced ports to effect transition from said connected condition thereof to a disconnected condition thereof in said application position, thereby providing a brake control function;
   (e) a first spring acting on said spool member in the direction of said release position through the full range of travel of said spool member between said release and application positions; and
   (f) a second spring acting on said spool member in the opposing direction of said first spring, but through only a limited distance from said release position of said spool member and without extending said spool member to said intermediate position, whereby said second spring acts on said spool member only prior to said transition between said connected and disconnected conditions.

2. Valve means as recited in claim 1, further characterized in that said second spring is compressed in said release position and is expanded to its free height prior to said spool member reaching said intermediate position during said movement of said spool member from said release position to said application position.

3. Valve means as recited in claim 2, wherein said second spring is compressed from its free height substantially 0.105–0.135 inches in said release position of said spool member.

4. Valve means as recited in claim 3, wherein said spring is disposed in said bore so as to engage one end of said bore and said spool member during said limited distance of travel thereof, said spring being disengageable from one of said spool member and said one end of said bore following said limited distance of travel of said spool member.

5. Valve means as recited in claim 2, wherein said second spring is a helical spring.

6. Valve means as recited in claim 2, wherein said second spring is a Belleville type disc spring.

7. Valve means as recited in claim 2, wherein said second spring is a wave spring.

8. Valve means as recited in claim 1, wherein said first spring acts on said spool member in the direction of said release position with at least a predetermined minimum force during said axial movement of said spool member between said application and release positions.

9. Valve means as recited in claim 8, wherein said predetermined minimum force is less than the force exerted by said second spring on said spool member in said release position thereof.

10. For a railway car having a brake pipe, a brake cylinder, and an emergency reservoir charged to the pressure carried in said brake pipe, a brake control valve device comprising:
   (a) a quick action chamber charged to the pressure carried in said brake pipe;
   (b) high pressure valve means for effecting an emergency brake control function;
   (c) means operative responsive to an emergency rate of reduction of said brake pipe fluid under pressure for piloting said high pressure valve means, said high pressure valve means comprising:
      (i) a spool member subject on one end thereof to fluid under pressure in said brake pipe and on the opposite end to fluid under pressure in said quick action chamber, said spool member having a first pressure seal surrounding the periphery thereof;
      (ii) a bushing in which said spool member is reciprocally disposed for axial movement between a release position and an application position, said bushing including first and second ports to which said emergency reservoir and said brake cylinder are connected respectively, said first pressure seal being located intermediate said first and second ports in said release position of said spool member to interrupt fluid pressure communication therebetween and displaced therefrom in said application position of said spool member to establish fluid pressure communication therebetween thereby providing a first aspect of said emergency brake control function;
      (iii) a first spring acting on said spool member in the direction of said release position; and
      (iv) a second spring acting on said spool member in the direction of said application position only during said movement of said spool member from said release position toward said application position prior to said first pressure seal being displaced from between said first and second ports, and during said movement of said spool member from said application position toward said release position only after said first pressure seal is aligned between said first and second ports.

11. A brake control valve device as recited in claim 10, further comprising:
   (a) inshot valve means for connecting said emergency reservoir fluid under pressure to said brake cylinder;
   (b) said bushing further including a third port to which said inshot valve means is connected;
   (c) said spool member including a second pressure seal surrounding the periphery thereof, said second pressure seal being located between said second and third ports in said application position of said spool member to interrupt fluid pressure communication therebetween, and displaced therefrom in said release position to establish fluid pressure communication therebetween, thereby providing a second aspect of said emergency brake control function; and (d) said second spring acting on said spool member only during said movement thereof from said release position to said application position prior to said second pressure seal being aligned between said second and third ports, and during said movement of said spool member from said application position toward said release position only after said second pressure seal is displaced from between said second and third ports.

12. A brake control valve device as recited in claim 11, wherein said spool member further includes a third pressure seal surrounding the periphery thereof adjacent said second pressure seal, said third pressure seal being on the side of said third port opposite said second pressure seal in said application position of said spool member.

13. A brake control valve device as recited in claim 12, further comprising:
   (a) said bushing further including a fourth port connected to atmosphere;
   (b) said spool member further including a fourth pressure seal surrounding the periphery thereof, said fourth pressure seal being located on one side of said fourth port adjacent said opposite side of said spool member to interrupt fluid pressure communication therebetween when said spool member is in said release position and located on the other side of said fourth port to establish fluid pressure communication therebetween when said spool member is in said application position, thereby providing a third aspect of said emergency brake control function; and
   (c) said second spring acting on said spool member only during said movement thereof from said release position toward said application position prior to said fourth pressure seal being located on said other side of said fourth port, and during movement of said spool member from said application position toward said release position only after said fourth pressure seal is located on said one side of said fourth port.

14. A brake control valve device as recited in claim 13, further characterized in that said second spring is compressed substantially 0.105–0.135 in. from its free height in said release position of said spool member, such that the distance said spool member moves from said release position toward said application position prior to any one of said first, second and fourth pressure seals crossing any one of said first, second, third and fourth ports is nominally 0.120 in.

15. A brake control valve device as recited in claim 10, wherein said second spring is a helical spring.

16. A brake control valve device as recited in claim 10, wherein said second spring is a Belleville type disc spring.

17. A brake control valve device as recited in claim 10, wherein said second spring is a wave spring.

* * * * *